US008300059B2

(12) United States Patent
Isidoro et al.

(10) Patent No.: US 8,300,059 B2
(45) Date of Patent: Oct. 30, 2012

(54) METHOD AND APPARATUS FOR SELECTING A MIP MAP LEVEL BASED ON A MIN-AXIS VALUE FOR TEXTURE MAPPING

(75) Inventors: John R. Isidoro, Framingham, MA (US); Tien E. Wei, Marlborough, MA (US)

(73) Assignee: ATI Technologies ULC, Markham, Ontario (CA)

( * ) Notice: Subject to any disclaimer, the term of this patent is extended or adjusted under 35 U.S.C. 154(b) by 1424 days.

(21) Appl. No.: 11/347,653

(22) Filed: Feb. 3, 2006

(65) Prior Publication Data

US 2007/0182753 A1   Aug. 9, 2007

(51) Int. Cl.
*G09G 5/00*   (2006.01)
(52) U.S. Cl. .......................................... 345/587; 345/582
(58) Field of Classification Search .................. 345/587, 345/582
See application file for complete search history.

(56) References Cited

U.S. PATENT DOCUMENTS

| | | | | |
|---|---|---|---|---|
| 5,097,427 A | * | 3/1992 | Lathrop et al. ................. | 345/587 |
| 5,831,624 A | * | 11/1998 | Tarolli et al. ................... | 345/587 |
| 5,870,097 A | * | 2/1999 | Snyder et al. ................... | 345/426 |
| 6,005,583 A | * | 12/1999 | Morrison ........................ | 345/587 |
| 6,040,837 A | * | 3/2000 | Wong et al. ..................... | 345/586 |
| 6,219,064 B1 | * | 4/2001 | Kamen et al. ................... | 345/582 |
| 6,252,608 B1 | * | 6/2001 | Snyder et al. ................... | 345/473 |
| 6,501,482 B1 | * | 12/2002 | Rosman et al. ................. | 345/587 |
| 7,369,136 B1 | * | 5/2008 | Heckbert et al. ............... | 345/582 |
| 2002/0126133 A1 | * | 9/2002 | Ewins ............................. | 345/587 |
| 2004/0130552 A1 | * | 7/2004 | Duluk et al. .................... | 345/506 |
| 2004/0257364 A1 | * | 12/2004 | Basler ............................. | 345/426 |
| 2004/0257376 A1 | * | 12/2004 | Liao et al. ....................... | 345/587 |
| 2006/0170681 A1 | * | 8/2006 | Ohba .............................. | 345/426 |

* cited by examiner

*Primary Examiner* — Maurice L McDowell, Jr.
(74) *Attorney, Agent, or Firm* — Faegre Baker Daniels LLP

(57) ABSTRACT

Min-axis based mip map determination logic receives a plurality of texture space derivatives with respect to screen space for a given pixel and texel location and selects from a plurality of mip map levels a mip map level based on a min-axis without using a max-axis value and without using an amount of anisotropy. The plurality of mip map levels corresponds to mip map levels of a mip chain. The min-axis may be identified as the squares of the texture space derivatives with respect to either the x-axis or the y-axis of screen space. Selecting the mip map level based on the min-axis ensures that each texel of the selected mip map never maps to more than one pixel during texture mapping where the main texture is of sufficient resolution. Thus, using the mip map level based on the min-axis to fetch texture data from memory and render images results in few aliasing artifacts.

21 Claims, 10 Drawing Sheets

METHOD AND APPARATUS FOR SELECTING A MIP MAP LEVEL BASED ON A MIN-AXIS VALUE FOR TEXTURE MAPPING

FIELD OF THE INVENTION

The invention generally relates to video graphics processing and more particularly to selecting a mip map level based on a min-axis value for texture mapping in a three-dimensional video graphics system.

BACKGROUND OF THE INVENTION

Computers are used in many applications. As computing systems continue to evolve, the graphical display requirements of the systems become more demanding. This is especially true in applications where three-dimensional graphic displays must be updated quickly. One example of such an application is a computer game where movement and modification of background images may place great demands on the processing power of the computing system.

In order to display some screen images, detailed textures are stored in memory. These textures are then filtered and adapted to map to structures or graphic primitives for subsequent display. An example is a brick pattern that can be mapped onto a wall structure. If the wall is extending into the distance, then the texture will be mapped in such a way to show perspective. In other examples, shadow maps are used to provide shadows to rendered graphics. Shadow maps are textures where each texel in the texture represents a depth value indicating at what distance the light hits a surface. In such a manner, texture mapping adds realism to the computer-generated graphic.

In shadow mapping, adequate sampling of the shadow map poses two sequential and interdependent rendering problems. First, the pixel depths of a scene must be rendered at an adequate resolution from the light's point of view. Second, the main shadow texture must be adequately sampled to render the scene using the sampled shadow map. Because the scene complexity may vary, the use of a single shadow map sampled at one sampling rate may result in using various texel-to-pixel ratios for different portions of the screen. The texel-to-pixel ratio is indicative of the number of texels that map to a particular pixel being rendered. In other words, while the resolution of the shadow map may be adequate for some portions of the scene, the shadow map is in minification mode for other regions of the scene. One of ordinary skill will recognize that minification mode corresponds to a mapping mode wherein multiple texels map to one pixel. When rasterizing portions of the scene where the shadow map is in minification mode, the memory access pattern within the texture is fairly sparse, i.e., the memory access pattern is not localized in a small region in a texture, resulting in poor texture cache coherency. Put another way, because a region in the shadow map may map to several different regions of the scene, the number of memory accesses is large and certain regions of the texture may be accessed several times with each access possibly causing a cache miss. Thus, texture bandwidth requirements are increased.

Those having ordinary skill in the art will recognize that mip maps have been utilized to facilitate the use of textures in texturing operations. Mip maps are pre-calculated, optimized collections of two-dimensional or three-dimensional images associated with a main texture stored in computer memory for access when rendering. In some instances, mip maps are stored in texture cache memory for quick access by a video graphics engine. By employing multiple, scaled versions of a texture during rendering operations, processing requirements and visual artifacts in the rendered image are reduced while execution speed of the application (i.e., the rendering speed) is increased. The reduction of aliasing artifacts is attributed to, among other things, the use of pre-filtered, lower resolution images (i.e., mip maps) generated from the original texture. The execution speed is attributed to, among other things, reducing unnecessary texture bandwidth by replacing a sparse sequence of fetches on a single, high resolution texture with a more dense sequence of fetches on a more localized region of smaller textures (i.e., mip maps) thus improving cache coherency. In other words, the number of memory accesses is reduced.

Typically, mip maps associated with a main texture are categorized as part of a mip map chain consisting of several mip maps where each mip map corresponds to a particular level. The top level mip map may be the main texture itself or any other suitable version thereof and each successive mip map located below it in the chain is derived from its parent, i.e., the mip map located directly above it. Thus, successive mip maps each have less detail than its parent. Generally, each mip map level in the chain is one-quarter the size of its parent. For instance, the first mip map in the chain may have a resolution of 512×512. The next mip map in the chain may have a resolution of 256×256. The third mip map in the chain may have a resolution of 128×128, etc. Accordingly, based on the structure or graphics primitive on a screen, the computer can select a suitable mip map having the appropriate level of detail to perform texture operations in order to increase processing speed. Using a low mip map level on the chain translates into using a smaller mip map having less detail than the main texture, thus saving processing resources.

While a variety of techniques may be used to generate mip map chains for all types of textures, two prior art techniques are described below for purposes of example only. Non-shadow map mip maps, such as color texture maps, are commonly generated by filtering and downsampling its parent mip map. Generally, filtering is performed by taking, for each mip map texel, the average of its four parent texels. Filtering a shadow map, however, is not beneficial because taking the average of a texel's four parent texels biases at least one texel of the shadow map toward the light source. In other words, because shadow map texels represent depth values, the average depth value of four texels may be a smaller value than one or more of the parent texels. A smaller depth value results in the region appearing closer to the light source than the furthest depth value. Instead, it is beneficial to use the max depth value of the four patent texels to generate each mip map texel. This results in an image with a less undesirable artifacts because the region is never closer to the light source. While additional erroneous, self shadowing is reduced, the side effect of using the max depth value is that shadows are reduced in size when rendered.

The current approach used by video graphics engines select a mip map level according to a variety of selection schemes including a max-axis selection scheme and an anisotropic filtering mip map level selection scheme. Generally, prior art selection schemes first generate or determine the texture space derivatives of the texture coordinates with respect to screen space for a given pixel being rendered. Because screen space coordinates are generally represented as (x, y) and because texture space coordinates are generally represented as (u, v), vectors $(\partial u/\partial x, \partial v/\partial x)$ and $(\partial u/\partial y, \partial v/\partial y)$ may be identified using these derivatives that represent the projection of the pixel's edges in texture space for the current pixel and texel location. In other words, the vectors defined above approximate the pixel's footprint in texture space. A pixel footprint in texture space may take any suitable shape. For example, the footprint may be long and narrow when surfaces are viewed at oblique angles. Accordingly, the lengths of the pixel's edges in texture space may vary greatly according to the vectors provided above.

To select a mip map according to the max-axis mip map level selection scheme, where the selected mip map level, $miplevel_{max}$, is determined according to the following equations:

$$xAxis^2 = \left(\frac{\partial u}{\partial x}\right)^2 + \left(\frac{\partial v}{\partial x}\right)^2;$$

$$yAxis^2 = \left(\frac{\partial u}{\partial y}\right)^2 + \left(\frac{\partial v}{\partial y}\right)^2;$$

$$miplevel_{max} = 0.5 * \log_2(\max(xAxis^2, yAxis^2));$$

wherein $xAxis^2$ corresponds to the summation of the squares of the texture space derivatives with respect to the x-axis of screen space and wherein $yAxis^2$ corresponds to the summation of the squares of the texture space derivatives with respect to the y-axis of screen space. In this example, the max-axis corresponds to the greater of the $xAxis^2$ and the $yAxis^2$. The above scheme is generally utilized where the texture data fetched using the max-axis mip map level selection scheme is filtered using an isotropic filtering scheme. As known in the art, isotropic filtering schemes may include or incorporate, for example, bilinear texture filtering, trilinear texture filtering, nearest texture sampling, or bicubic texture filtering.

The max-axis mip map level selection scheme chooses the max-axis (i.e., the longest pixel edge in texture space), represented by the equation $\max(xAxis^2, yAxis^2)$. Use of the max-axis to select a mip map level generally results in a reduction in the number of aliasing artifacts present in the rendered image for most texture maps. While aliasing is reduced, the rendered image may appear blurred due to the manner in which mip map chains are constructed as downsampled versions of the original main texture. The max-axis scheme is used for most texture operations because aliasing artifacts have a greater adverse effect on the quality of the rendered image than portions thereof which appear blurry.

Another related technique for selecting a mip map level utilizes an anisotropic filtering mip map level selection scheme based on at least one of a max-axis based mip map level, an amount of anisotropy and a min-axis based mip map level. In one type of anisotropic filtering, the mip map level, $miplevel_{aniso}$, is determined according to the following equations:

$$miplevel_{min} = 0.5 * \log_2(\min(xAxis^2, yAxis^2));$$

$$miplevel_{aniso} = \max(miplevel_{max} - \log_2(mxaniso), miplevel_{min});$$

wherein $miplevel_{max}$, $xAxis^2$, and $yAxis^2$ are determined according to the equations previously presented. The variable mxaniso represents an amount or degree of anisotropy desired and is generally predetermined based on the capability of the computing system and/or the application running on the computer system. In one embodiment, mxaniso is stored in a register or any other suitable memory structure or structures for use by the computer system or video graphics engine. While the equation above provides one example of selecting a mip map level based on an amount of anisotropy, one of ordinary skill in the art will recognize that other suitable equations could be used when in an anisotropic filtering mode. In anisotropic texture filtering, the mip map level may be selected at a few levels higher than in the max-axis mip map level selection scheme in anticipation of multiple samples being taken and filtered. However, in the case of anisotropic filtering, the number of mip map levels above the max-axis selected level is limited by the number of texture samples taken in the anisotropic filters since aliasing artifacts remain an issue due to the nature of the anisotropic filtering algorithm.

In the context of shadow mapping, however, neither selection scheme adequately reduces the number of artifacts in the rendered image. Using a shadow map in texture mapping differs from the application of standard texture maps (i.e., non-shadow map texture maps such as color texture maps) in that selecting a mip map level low in the mip map chain is equivalent to undersampling the scene in shadow map space. Thus, when applying a shadow map to a surface or primitive, aliasing artifacts result where a single texel maps to several screen pixels. The effect is most visible where a shadow projected on a surface is viewed at an oblique angle, thus causing a single texel to map to several screen pixels. This happens to correspond to the situation where the difference between $xAxis^2$ and $yAxis^2$ is large.

FIG. 1 illustrates the effect the application of the max-axis mip map level selection scheme has on a rendered scene 100 when the texture applied to the video graphics primitives is a shadow map. As illustrated, the scene includes a background 102, a floor 104, a first pillar 106, a second pillar 108 and a light source 110. As expected, the light source 110 causes a first shadow 112 associated with the first pillar 106 and a second shadow 114 associated with the second pillar 108. Aliased artifacts 116 adversely affect the quality of the rendered scene 100 by extending the color or other pixel parameters of the floor 104 onto pixel locations that should be associated with the first and second shadows 112 and 114. Similarly, aliased artifacts 118 adversely affect the quality of the rendered scene 100 by improperly extending the first and second shadows 112 and 114 onto locations on the floor 104 that should not be in shadow.

Thus, a need exists for a mip map level selection scheme that prevents aliased artifacts in a rendered scene when a texture map, such as for example a shadow map, is applied to structures or graphics primitives. A similar need exists for a mip map level selection scheme designed to prevent a texel from mapping to more than one pixel where the main texture is of sufficient resolution.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Figure 1:
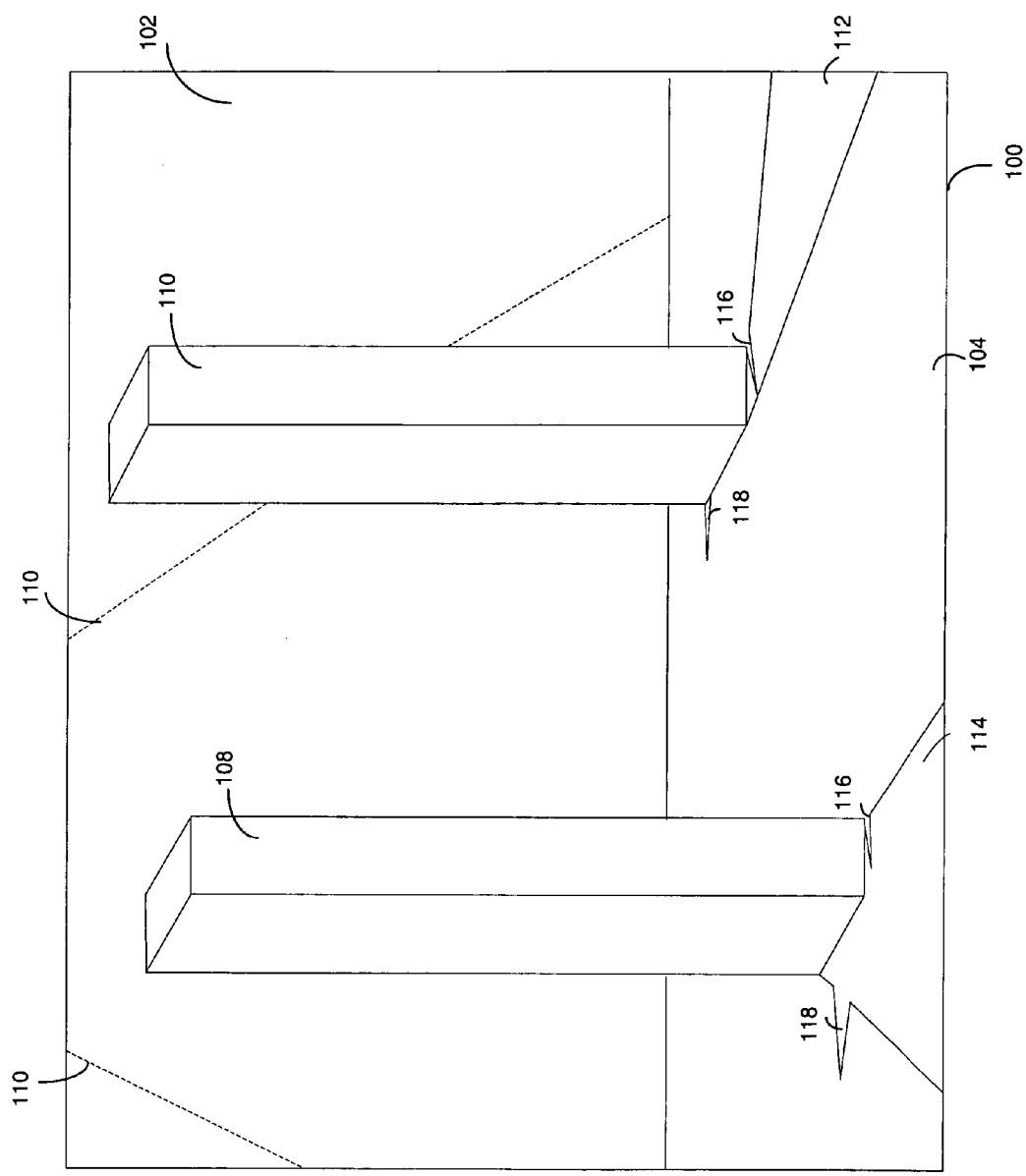
FIG. 1 illustrates video graphics primitives rendered on a display using a max-axis mip map level selection scheme.

Generally, the present disclosure provides a method and apparatus for selecting a mip map level based on a min-axis level for use in texture mapping. In one embodiment, min-axis based mip map level determination logic receives a plurality of texture space derivatives with respect to screen space, such as du/dx, dv/dx, du/dy and dv/dy, and responsively selects a mip map level from a plurality of mip map levels, for instance in a mip map chain. The selected mip map level is based on a min-axis value without using a max-axis value and without using an amount of anisotropy. As provided in the background, no prior art mip map level selection scheme solely used a min-axis value to determine the desired mip map level. Thus, as indicated in FIG. 1, the images rendered using such schemes inadequately prevented aliased artifacts.

In one embodiment, selection of a mip map level based on a min-axis value may correspond to identifying the min-axis using the plurality of texture space derivatives with respect to screen space for a given pixel and texel using the mathematical equivalent or an approximation of:

$$xAxis^2 = \left(\frac{\partial u}{\partial x}\right)^2 + \left(\frac{\partial v}{\partial x}\right)^2;$$

$$yAxis^2 = \left(\frac{\partial u}{\partial y}\right)^2 + \left(\frac{\partial v}{\partial y}\right)^2;$$

$$\text{min-axis} = \min(xAxis^2, yAxis^2).$$

As indicated, the min-axis value is the smaller of $xAxis^2$ and $yAxis^2$. Accordingly, the mip map level based on the min-axis value may correspond to using the mathematical equivalent or an approximation of:

$$miplevel_{min} = C * \log_2(\min(xAxis^2, yAxis^2));$$

where C is any suitable constant and $miplevel_{min}$ represents the selected mip map level.

Using the selected mip map level, texture addressing logic responsively fetches texture data from memory for further processing. In one embodiment, the mip map level is selected during shadow mapping where a shadow texture is being applied to pixel data for a more realistic scene. In another embodiment, further processing may consist of determining whether a pixel is in a shadow based on the fetched texture data and then providing the pixel for display on any suitable display. By fetching texture data based on the selected mip map level based on a min-axis value without using a max-axis value and without using an amount of anisotropy, a texel in a texture map, such as a color texture or shadow texture, is never allowed to map to more than one pixel. Thus, unwanted, aliased artifacts are reduced in a rendered scene and processing speed is increased.

In another embodiment, mip map level determination logic is provided and capable of selecting a mip map level from at least a first mip map level and a second mip map level where the first mip map level is based on a min-axis value without using a max-axis value and without using an amount of anisotropy and where the second mip map level is based on a max-axis value. Both the min-axis value and the max-axis value are based on a received plurality of texture space derivatives with respect to screen space. In one implementation, the selected mip map level is based on a variety of factors including, among other things, enable data used and filter mode data. In one instance, enable data may indicate whether to select the mip map level based on a min-axis (e.g., using min-axis enable data) or to select a mip map level based on a max-axis (e.g., using max-axis enable data). Enable data may be linked to the type of texture mapping currently used in the system. For instance, if the system is shadow mapping, min-axis enable data may be set such that the mip map level determination logic selects the mip map level based on a min-axis. Filter mode data, indicative of the type of filtering the system will apply to fetched texture data, may also be used to select the mip map level.

In another embodiment, the mip map level determination logic may calculate a third mip map level based on at least one of the first mip map level, the second mip map level and an amount of anisotropy. Accordingly, the mip map level determination logic may select one of the first mip map level, the second mip map level and the third mip map level. In one embodiment, the selection of the three mip map levels is made by first selecting one of the first mip map level and the second mip map level as described above and subsequently selecting one of the third mip map level and the previously selected first mip map level or second mip map level. Thus, the method and apparatus allows an application to render images based on a max-axis mip map level selection scheme, a min-axis mip map selection level scheme or an anisotropic filtering mip map level selection scheme.

The present embodiments relate to a method and apparatus for selecting a mip map level based on a min-axis for texture mapping. In the following detailed description, numerous specific details are set forth in order to provide a thorough understanding of the present disclosure. It will be apparent to one of ordinary skill in the art, however, that these specific details need not be used to practice the present disclosure. In other instances, well-known structures, interfaces and processes have not been shown in detail in order not to unnecessarily obscure the present disclosure.

Figure 2:
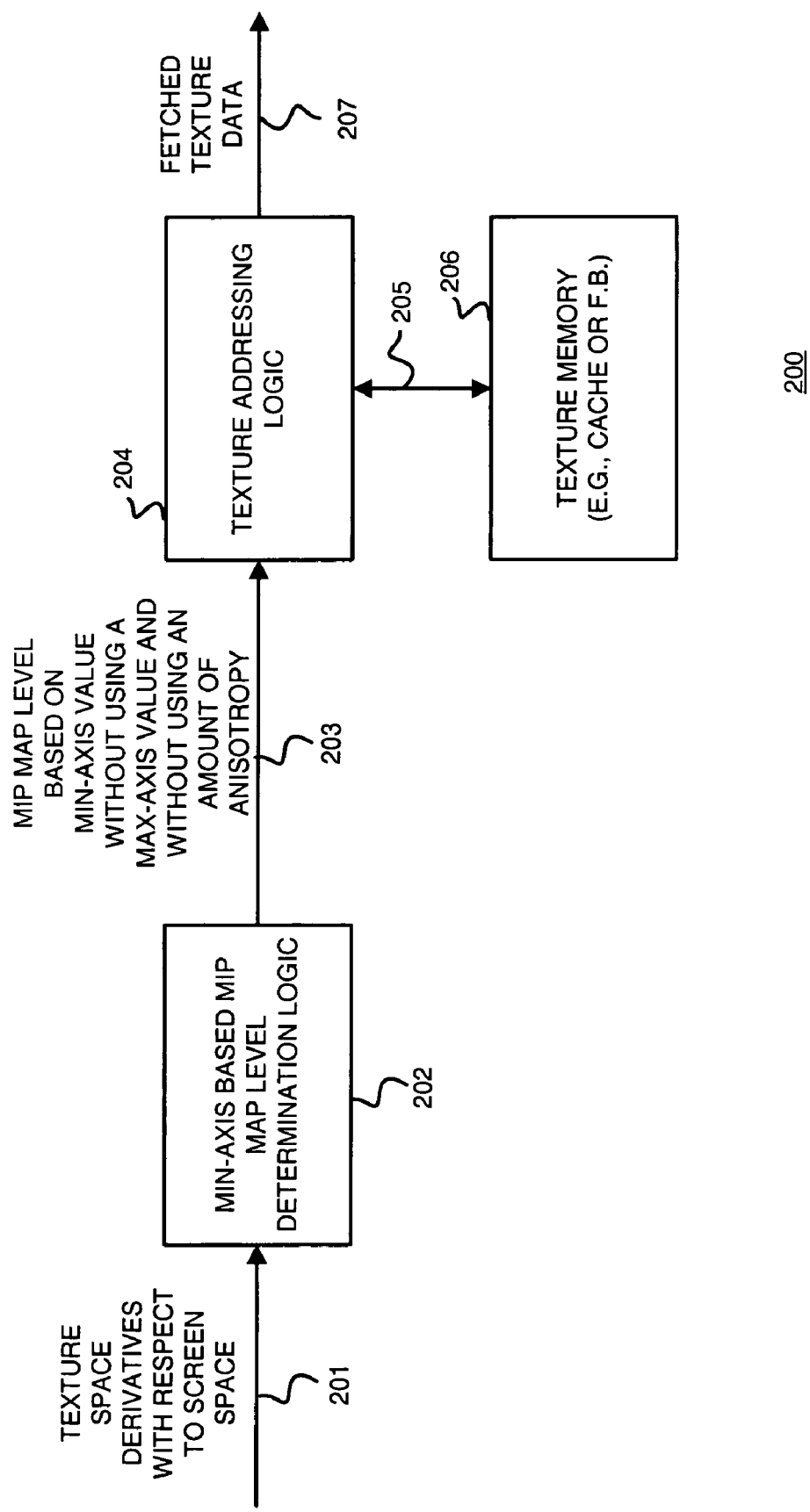
FIG. 2 is a block diagram illustrating one example of a system for selecting a mip map level based on a min-axis value when texture mapping in accordance with one embodiment of the present disclosure.

The present disclosure can be more fully described with reference to FIGS. 2-10. FIG. 2 is a block diagram illustrating one example of a system 200 for selecting a mip map level based on a min-axis value when texture mapping in accordance with one embodiment of the present disclosure. System 200 includes min-axis based mip map level determination logic 202, texture addressing logic 204 and texture memory 206. It is contemplated that system 200 may be associated with a computer system (not shown) or, more specifically, the video graphics rendering engine of a computer system. In one embodiment, system 200 and its individual components may be disposed on one or more physical cards for use in a computer system. For instance, system 200 may be manufactured with or composed of one or more integrated circuits (ICs), discrete logic devices, state machines, application specific integrated circuits (ASICs), or any other suitable programmable or non-programmable structure or structures. Alternatively, system 200 and its logic components as listed above may be implemented in software as a plurality of executable instructions stored in suitable memory where the plurality of executable instructions may be executed by one or more suitable processors such as a CPU and a GPU (not shown). Executable instructions may be stored in any suitable memory device or devices such as by not limited to volatile and non-volatile memory, random access memory (including e.g., RAM, DRAM, SRAM), ROM-based memory (including e.g., ROM, PROM, EPROM, EEPROM) and flash memory. It is similarly contemplated that the processor may include at least one processing device such as, but not limited to, any suitable distributed or non-distributed processing or microprocessing device.

The min-axis based mip map level determination logic 202 may receive texture space derivatives with respect to screen space 201 such as du/dx, dv/dx, du/dy and dv/dy, from another portion of the computer system or portion of a video graphics rendering engine, such as e.g., a pixel shader. Based on the texture space derivatives with respect to screen space 201, the min-axis based mip map level determination logic 202 selects a mip map level from a plurality of mip map levels based on a min-axis value without using a max-axis value and without using an amount of anisotropy 203. In other words, the mip map level is selected based solely on a min-axis value. In one embodiment, the selection of the mip map level is made during shadow mapping, e.g., when rendering pixels according to a texture containing shadow data (i.e., a shadow map).

In one embodiment, the selection of the mip map level, miplevel$_{min}$, uses the following equation:

$$\text{miplevel}_{min} = C^* \log_2(\min(x\text{Axis}^2, y\text{Axis}^2)),$$

wherein, C corresponds to a constant, and wherein xAxis$^2$ and yAxis$^2$ are determined based on the equations previously presented. In one embodiment, C is set at 0.5. In another embodiment, C may correspond to any suitable constant, for example, any value between 0.4 and 0.6. In this embodiment, the min-axis corresponds to the smaller of the xAxis$^2$ and the yAxis$^2$. Conversely, the max-axis corresponds to the larger of the xAxis$^2$ and the yAxis$^2$. It is contemplated that suitable logic may be used to implement either the exact mathematical statements provided above or provide a suitable result by implementing an approximation thereof. It is further contemplated that if min-axis based mip map level determination logic 202 is implemented in software where a processor executed instructions stored in memory, then the min-axis based mip map level determination logic 202 may use the mathematical statements provided above or any suitable equivalent to select a mip-map level based on the min-axis value without using a max-axis value and an without using amount of anisotropy.

Coupled to the min-axis based mip map level determination logic 202, the texture addressing logic 204 receives the selected mip map level based on the min-axis value 203 and fetches the corresponding texture data 205 associated with the selected mip map level based on the min-axis value 203 from a texture memory 206. As is understood in the art, a mip map level may be any value used to reference a particular mip map (i.e., a type of texture map) in a mip map chain. The value may be an integer or a fraction. Based on the mip map level, i.e., a value, texture addressing logic 204 fetches texture data from one or more corresponding mip maps. Texture memory 206 may correspond to texture cache, frame buffer memory or any other suitable memory. In one embodiment, the texture memory 206 may be any suitable memory device or devices such as but not limited to volatile and non-volatile memory, random access memory (including e.g., RAM, DRAM, SRAM), ROM-based memory (including e.g., ROM, PROM, EPROM, EEPROM) and flash memory. Accordingly, texture addressing logic 204 passes the fetched texture data 207 to another portion of the computer system or video graphics rendering engine, such as, e.g., back to a pixel shader for further processing.

Figure 3:
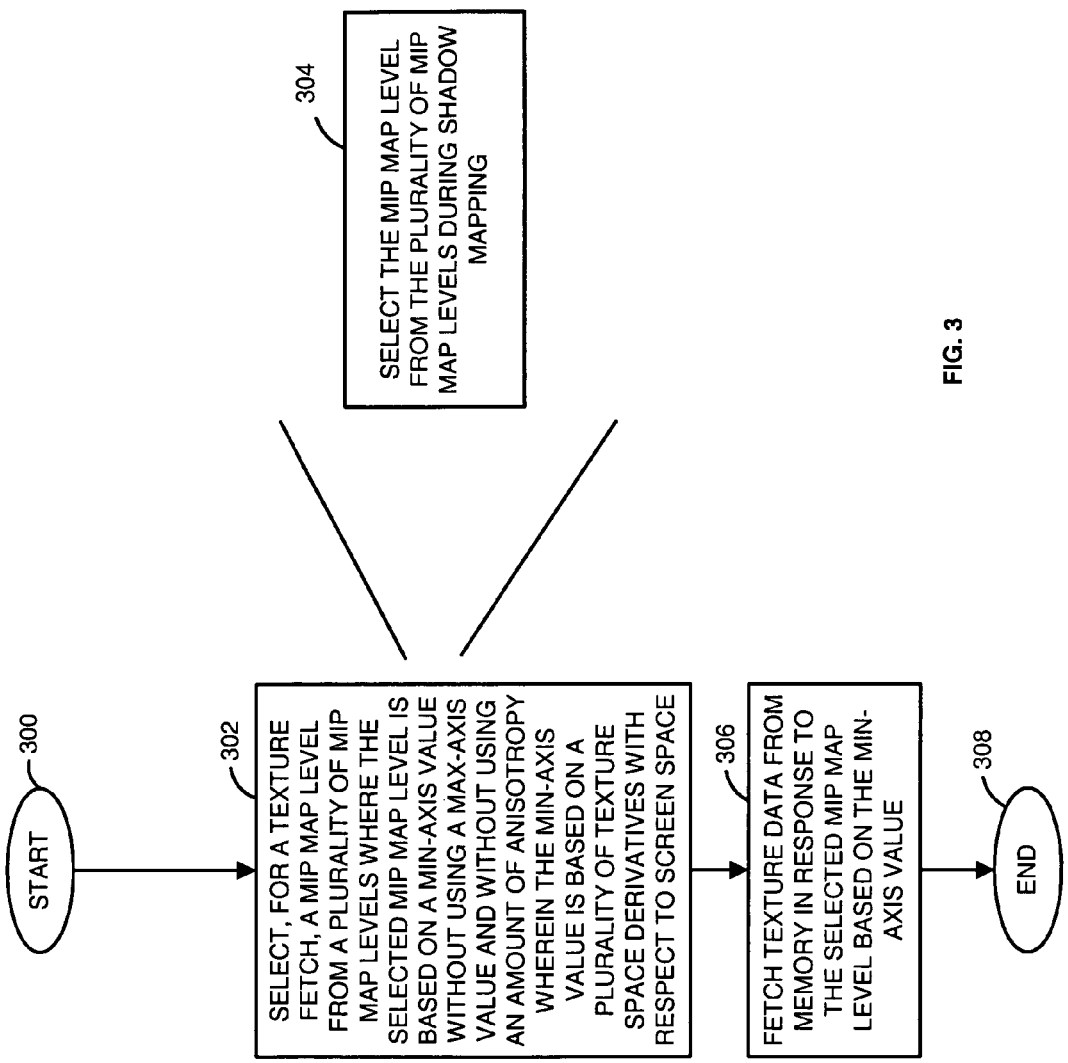
FIG. 3 is a flow chart illustrating one example of a method for selecting a mip map level based on a min-axis value when texture mapping in accordance with one embodiment of the present disclosure.

FIG. 3 is a flow chart illustrating one example of a method for selecting a mip map level based on a min-axis value when texture mapping in accordance with one embodiment of the present disclosure, such as, for example, with system 200 of FIG. 2. The method begins with block 300 where, for example, a plurality of texture space derivatives with respect to screen space are received. As indicated above with respect to FIG. 2, the plurality of texture space derivatives with respect to screen space 201 may be received by any suitable portion of a computer system or video graphics rendering engine.

Accordingly, the method continues with block 302 where a mip map level based on a min-axis value without using a max-axis value and without using an amount of anisotropy is selected for a texture fetch from a plurality of mip map levels (e.g., from a mip map chain) wherein the min axis value is based on the plurality of texture space derivatives with respect to screen space. As provided above with respect to FIG. 2, the selection of the mip-map level based on a min-axis value without using a max-axis value and without using an amount of anisotropy may utilize the following equation, its mathematical equivalent or approximation thereof:

$$\text{miplevel}_{min} = C^* \log_2(\min(x\text{Axis}^2, y\text{Axis}^2)).$$

In one embodiment, as illustrated in block 304, the selection of the mip map level is made during shadow mapping. For purposes of illustration, the selection of a mip map level based on a min-axis value as described with reference to blocks 302 and 304 may be performed using the min-axis based mip map level determination logic 202 in system 200.

The method of FIG. 3 continues in block 306 by fetching texture data from memory in response to the selected mip map level based on the min-axis value. It is contemplated that in one embodiment the texture data corresponds to the selected mip map level based on the min-axis value and that the texture data is fetched by the texture addressing logic 204 of FIG. 2. Lastly, the method concludes in block 308 where, for example, the fetched texture data may be passed to other portion of the computer system or video graphics rendering engine components for subsequent processing or storage prior to being displayed.

Figure 4:
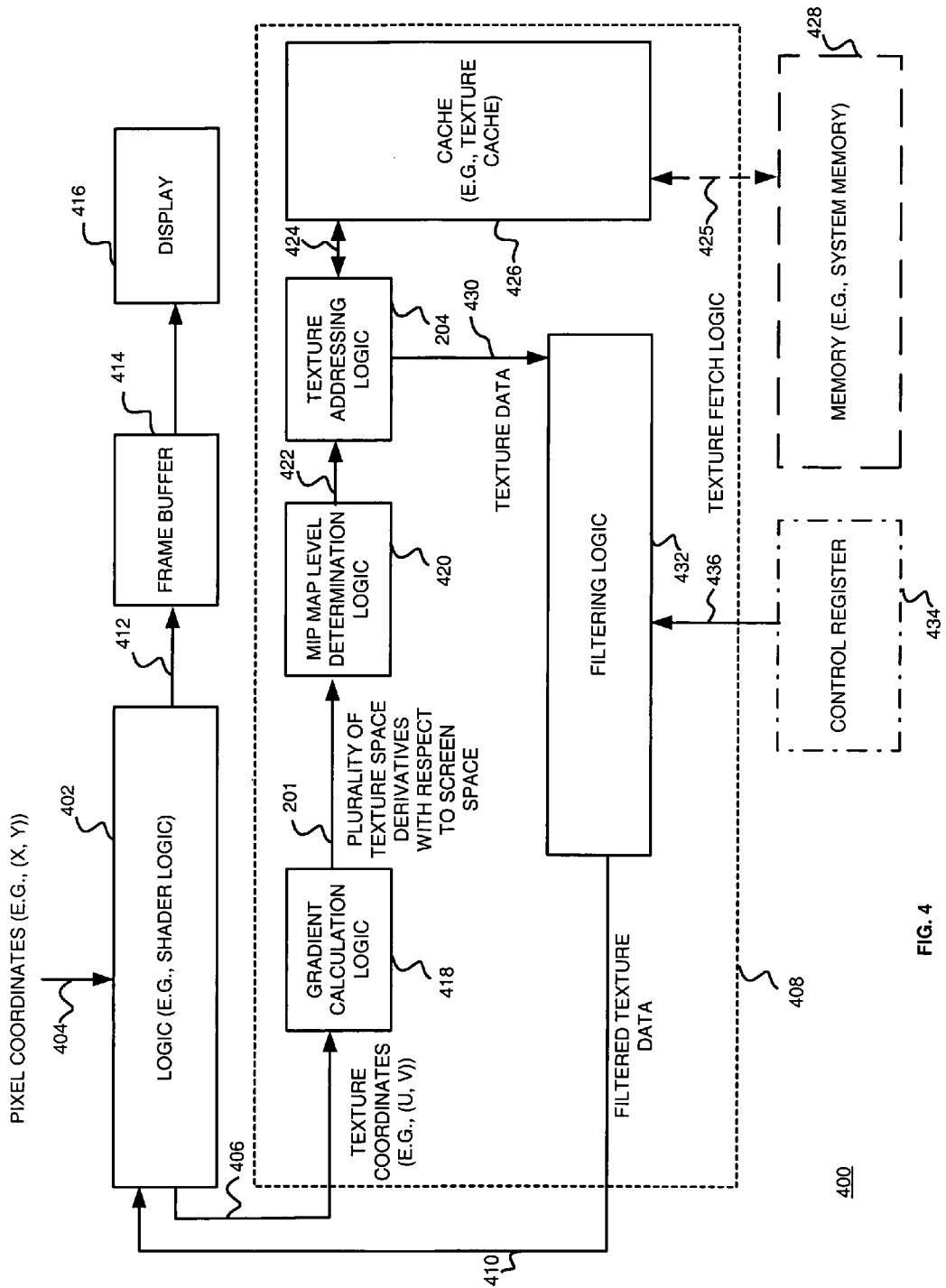
FIG. 4 is a block diagram illustrating one example of a system for selecting a mip map level from at least two mip map levels where one of the mip map levels is based on a min-axis value in accordance with one embodiment of the present disclosure.

FIG. 4 is a block diagram illustrating one example of a system 400 for selecting a mip map level from at least two mip map levels where one of the mip map levels is based on a min-axis value in accordance with one embodiment of the present disclosure. System 400 includes, among other things, logic 402 that receives pixel coordinates 404 for a given pixel and determines texture coordinates 406 for the given pixel based on the pixel coordinates 404. It is contemplated that in one embodiment, logic 402 may correspond to shader logic used to determine the final surface properties of an object or image. As illustrated, texture fetch logic 408 receives the determined texture coordinates 406 for the given pixel and generates therefrom filtered texture data 410. Logic 402 is coupled to receive the filtered texture data 410 for subsequent processing. For instance, logic 402 may implement additional filtering techniques on the filtered texture data 410 and may map at least a portion of the filtered texture data 410 to the pixel coordinates 404, thereby generating rendered pixel data 412. Frame buffer 414 is coupled to receive the rendered pixel data 412 and subsequently provide the rendered pixel data 412 for display on display 412. It is contemplated that any suitable rendering mechanism may be utilized in this process. It is further contemplated that the data stored in frame buffer 414 may subsequently be output to display 416 in accordance with known techniques for display to a user.

Logic 402, texture fetch logic 408, and frame buffer 414 may be associated with a computer system (not shown) or more specifically, the video graphics rendering engine of a computer system. In one embodiment, logic 402, texture fetch logic 408 and frame buffer 414 may be disposed on one or more physical cards for use on a computer system. For instance, logic 402, texture fetch logic 408 and frame buffer 414 may be manufactured with or composed of one or more ICs, discrete logic devices, state machines, ASICs, or any other suitable programmable or non-programmable structure or structures. Alternatively, system logic 402 and texture fetch logic 408 may be implemented in software where computer instructions are stored in memory and executed by any suitable processor (not shown). It is contemplated that the processor may include at least one processing device such as, but not limited to, any suitable distributed or non-distributed processing or microprocessing device. Additionally, it is contemplated that display 416 may be a CRT, LCD or any other suitable display device directly associated with or capable of being adapted to the system 400.

Texture fetch logic 408 comprises, among other things, gradient calculation logic 418 which receives texture coordinates 406 from logic 402 and generates therefrom the plurality of texture space derivatives with respect to screen space 201. By calculating the plurality of texture space derivatives with respect to screen space 201, the vectors representing the projection of the pixel's edges in texture space for the current pixel and texel location are known. Coupled to gradient calculation logic 418, mip map level determination logic 420 receives the plurality of texture space derivatives with respect to screen space 201 and generates therefrom data identifying the selected mip map level 422. As described above, mip map level determination logic 420 may select a mip map level from at least two mip map levels where one of the mip map levels is based on a min-axis value. Coupled to the mip map level determination logic 420, texture addressing logic 204 receives the data identifying the selected mip map level 422 and fetches texture data 430 from memory in response thereto. As illustrated, texture addressing logic may be coupled, directly or indirectly, to cache 426 and/or memory 428. In one embodiment, the cache 426 may be a texture cache dedicated to and associated with the texture fetch logic 408. In another embodiment, memory 428 may correspond to system memory or any other suitable memory and may be located internal or external to texture fetch logic 408. It is further contemplated that texture addressing logic 204 may communicate with cache 426 and/or memory 428 using any suitable convention to locate and retrieve texture data 430 from cache 426 and/or memory 428 along bi-directional communication paths 424 and 425.

Lastly, texture fetch logic 408 may include filtering logic 432 which receives the texture data 430 from texture addressing logic 204 and generates therefrom filtered texture data 410. It is contemplated that filtering logic 432 may utilize any suitable filtering scheme to average or sample the texels comprising the texture data 430 prior to passing the filtered texture data 410 to logic 402. As illustrated filter mode data 436, as provided from control register 434 or any other suitable source may select which filtering scheme to use. Control register 434 may be any suitable memory location or memory locations capable of storing one or more bits, such as filter control data 436, as provided by an application or as previously set by any other suitable means. Control register 434 may be internal or external to the texture fetch logic 408 and may correspond to a system control register or any other specialized control register used, for instance, in graphics processing. In one embodiment, filtering logic 432 uses an isotropic filtering scheme. As known in the art, isotropic filtering schemes may include or incorporate, for example, bilinear texture filtering, trilinear texture filtering, nearest texture sampling, or bicubic texture filtering. Alternatively, filtering logic 432 may use an anisotropic filtering scheme. Thus, in one embodiment, frame buffer 414 stores a generated image for display on display 416 wherein the generated image is generated using at least a portion of the fetched texture data 430.

As stated above, it is contemplated that texture fetch logic 408 and its associated individual components including, but not limited to, gradient calculation logic 418, mip map level determination logic 420, texture addressing logic 204, cache 426 and filtering logic 432, may be disposed on one or more physical cards for use in a computer system or a video graphics rendering engine. Accordingly, system 400 and its related logic components as listed above may be manufactured with or composed of, for example, one or more ICs, discrete logic devices, state machines, ASICs, or any other suitable programmable or non-programmable structure or structures. Alternatively, system 400 and its related logic components may be implemented in software where computer instructions are stored in memory and executed by any suitable processor (not shown). It is contemplated that the processor may include at least one processing device such as, but not limited to, any suitable distributed or non-distributed processing or microprocessing device. Moreover, it is further contemplated that cache 426, memory 428 and control register 434, like the texture memory 206 of FIG. 2, may correspond to any suitable memory device or devices such as but not limited to volatile and non-volatile memory, random access memory (including e.g., RAM, DRAM, SRAM), ROM-based memory (including e.g., ROM, PROM, EPROM, EEPROM) and flash memory.

Figure 5:
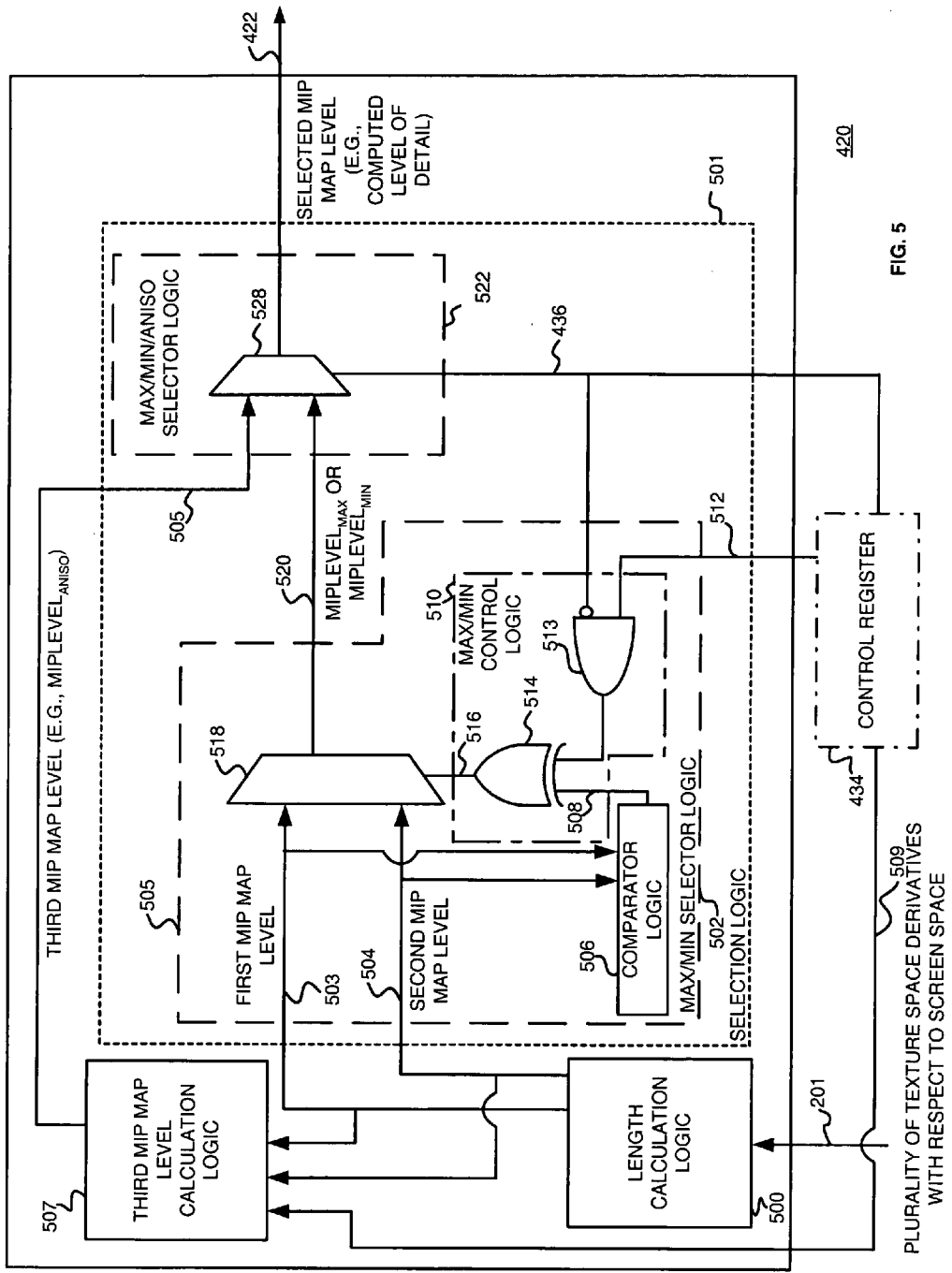
FIG. 5 is a block diagram illustrating one example of mip map level determination logic in accordance with the block diagram of FIG. 4 where the mip map level determination logic is capable of selecting a mip map level from at least two mip map levels where one of the mip map levels is based on a min-axis value in accordance with one embodiment of the present disclosure.

FIG. 5 is a block diagram illustrating one example of a mip map level determination logic 420 in accordance with the block diagram of FIG. 4 where the mip map level determination logic 420 is capable of selecting a mip map level from at least two mip map levels where one of the mip map levels is based on a min-axis value in accordance with one embodiment to the present disclosure. In one embodiment, mip map level determination logic 420 includes length calculation logic 500 coupled to third mip map level calculation logic 507 and selection logic 501. Length calculation logic 500 is operative to calculate, among other things, a first mip map level 503 and a second mip map level 504 based on the plurality of texture space derivatives with respect to screen space 201. As used herein and in the claims, the terms "first" and "second" are used as adjectives to differentiate the "first mip map level 503" from the "second mip map level 504." The terms "first" and "second" are not intended to associate one of the various mip map levels with a particular level of an associated mip map chain.

In one embodiment, one mip map level of the first mip map level 503 and the second mip map level 504 is based on a min-axis value that is based on the plurality of texture space derivatives with respect to screen space 201 without using a max-axis value and without using an amount of anisotropy. Similarly, another mip map level of the first mip map level 503 and the second mip map level is based on a max-axis value that is also based on the plurality of texture space derivatives with respect to screen space 201. In other words, while one of the mip map levels provided from length calculation logic 500 is based on a min-axis while the other mip map level is based on a max-axis. In one embodiment, the first mip map level 503 and second mip map level 504 may be calculated using the equations:

First mip map level=$C^* \log_2(x\text{Axis}^2)$.

Second mip map level=$C^* \log_2(y\text{Axis}^2)$.

If xAxis>yAxis, then the first mip map level 503 will correspond to the mip map level based on a max-axis, miplevel$_{max}$, while the second mip map level 504 will correspond to the mip map level based on the min-axis without using a max-axis value and without using an amount of anisotropy, miplevel$_{min}$. Accordingly, if xAxis<yAxis then the labels are reversed. It is contemplated that suitable logic may be used to implement either the exact mathematical statements provided above or provide a suitable result by implementing an approximation thereof.

As provided in the equations above, the first mip map level 503 is based on the xAxis value while and the second mip map level 504 is based on the yAxis value. However, it is contemplated that the first mip map level 503 may be determined based on the yAxis value while the second mip map level 504 may be based on the xAxis value. The interchangeability is acceptable because of the functionality of comparator logic 506 as described above. In both equations listed above, C represents a constant such as, for instance, 0.5 or any other suitable constant such as within the range of, for example, 0.4 to 0.6. Similarly, xAxis$^2$ and yAxis$^2$ correspond to the summation of the squares of the texture space derivatives with respect to the x-axis and y-axis of screen space, respectively.

Third mip map level calculation logic 507 receives the first mip map level 503 and the second mip map level 504 from length calculation logic 500 in addition to an amount of anisotropy 509 from control register 434. As provided above with respect to FIG. 4, control register 434 may be any suitable memory location or memory locations capable of storing one or more bits, such as data representing an amount of anisotropy 509, as provided by an application or as previously set by any other suitable means. While the same control register 434 as provided with respect to FIG. 4 may be used to store the amount of anisotropy, it is contemplated that the mip map level determination logic 420 may utilize a separate control register. In response to the first mip map level 503, the second mip map level 504 and the amount of anisotropy, third mip map level calculation logic calculates a third mip map level 505 that is determined based on at least one of the first mip map level 503, the second mip map level 504 and the amount of anisotropy 509. Third mip map level calculation logic 507 may correspond to any suitable logic capable of implementing any of the prior art anisotropic filtering mip map level selection schemes, as provided above or any other suitable mip map level selection scheme. In one instance, the mip map level, miplevel$_{aniso}$, is determined according to the following equation:

miplevel$_{aniso}$=max(miplevel$_{max}$−log$_2$($m$xaniso),miplevel$_{min}$)

where miplevel$_{aniso}$ represents the third mip map level 505. Accordingly, the third mip map level 505 is determined based on at least one of the first mip map level 503, the second mip map level 504 and the amount of anisotropy 509. It is contemplated that suitable logic may be used to implement either the exact mathematical statements provided above or provide a suitable result by implementing an approximation thereof. Similar to the first mip map level 503 and second mip map level 504, the term "third" is not meant to convey the order in which the third mip map level 505 may appear in a given mip map chain, but is provided to differentiate the third mip map level 505 from the first and second mip map levels 503, 504.

Receiving the first mip map level 503, the second mip map level 504, and the third mip map level 505, selection logic 501 selects one of the first mip map level 503, the second mip map level 504 and the third mip map level 505 for output as the selected mip map level 422. Max/min selector logic 502 receives from length calculation logic 500 the first mip map level 503 and the second mip map level 504 and selects one of the first mip map level 503 and the second mip map level 504 as the selected one of the first mip map level 503 and second mip map level 504 represented as miplevel$_{max}$ or miplevel$_{min}$ 520.

Max/min selector logic 502 includes comparator logic 506 which receives the first mip map level 503 and the second mip map level 504 and generates information 508 identifying one of the first mip map level and the second mip map level as having a greater resolution. In other words, comparator logic 506 operates to determine which of the first mip map level 503 and second mip map level 504 is higher on the mip map level chain and thus corresponds to a mip map having a greater resolution. In one embodiment if the first mip map level>the second mip map level, then information 508="0" whereas if the opposite is true, then information 508="1". Max/min control logic 502 further includes max/min control logic 510 which receives the information 508 identifying one of the first mip map level and the second mip map level as having a greater resolution, enable data 512 and filter mode data 436. As illustrated enable data 512 and filter mode data 436 are stored in control register 434 as explained above. It is further contemplated that enable data 512 (and filter mode data 436) may include one or more bits stored in one or more suitable memory locations.

Filter mode data 436, such as isotropic filter mode data and anistropic filter mode data, provide information identifying what type of texture filter scheme will be applied to texture data fetched using the selected mip map level 422. In one embodiment, texture filtering is provided by filtering logic 432 of FIG. 4. In one embodiment, filter mode data 436 is anisotropic filter mode data if filter mode data="1". Conversely, filter mode data 436 is isotropic filter mode data if filter mode data="0". As known in the art, isotropic filtering schemes may include or incorporate, for example, bilinear texture filtering, trilinear texture filtering, nearest texture sampling, or bicubic texture filtering. Enable data 512, such as min-axis enable data and max-axis enable data, provide information identifying whether max/min selector logic 512 should select one of the first mip map level 503 and the second mip map level 504 represented as miplevel$_{max}$ or miplevel$_{min}$ 520 based on a min-axis or max-axis, respectively. In one embodiment, enable data 512 is min-axis enable data if enable data="1". Conversely, enable data 512 is max-axis enable data if enable data="0".

Receiving the information 508 identifying one of the first mip map level and the second mip map level as having a greater resolution, enable data 512 and filter mode data 436, max/min control logic 510 generates therefrom max/min control data 516. Max/min control logic 510 corresponds to any suitable logic capable of generating data instructing max/min selector logic 505 which of the first mip map level 503 and the second mip map level 504 to select as represented by miplevel$_{max}$ or miplevel$_{min}$ 520. In one embodiment, max/min control logic 510 includes AND gate logic 513 where one input is inverted and EXCLUSIVE OR gate logic 514. AND gate logic 513 receives at the non-inverted input, enable data 512 such as min-axis enable data or max-axis enable data. At the inverted input, AND gate logic 513 receives filter mode data 436 such as isotropic filter mode data or anisotropic filter mode data. The logical output of AND gate logic 513 is coupled to one input of the EXCLUSIVE OR gate logic 514, where the second input of the EXCLUSIVE OR gate logic 514 receives information 108 identifying one of the first mip map level and the second mip map level as having a greater resolution. The logical output of the EXCLUSIVE OR gate logic 514 represents max/min control data 516.

Lastly, max/min selector logic 502 includes multiplexing logic 518 coupled to receive the first mip map level 503, the second mip map level 504 and the max/min control data 516. The output of the multiplexing logic 518, the selected one of the first mip map level 503 and second mip map level 504 represented as miplevel$_{max}$ or miplevel$_{min}$ 520, is based on the information contained in max/min control data 516. Using the convention provided above with respect to information 508 identifying one of the first mip map level and the second mip map level as having a greater resolution, enable data 512 and filter mode data 436, the multiplexing logic will select the first mip map level 503 if max/min control data="0" and the second mip map level 504 if max/min control data="1".

Selection logic 501 also include max/min/aniso selector logic 522 which receives the third mip map level 505 from third mip map length calculation logic 507 in addition to the selected one of the first mip map level 503 and the second mip map level 504 represented as miplevel$_{max}$ or miplevel$_{min}$ 520. As illustrated, max/min/aniso selector logic 522 includes multiplexing logic 528 which selects one of the third mip map level 505 and the selected first mip map level 503 or second mip map level 504 in response to the filtering mode data 436. The selected output of multiplexing logic 528 is the selected mip map level 422. In one embodiment, if filter mode data 436 represents anisotropic filter mode data (i.e., filter mode data 436="1"), then the selected mip map level 422 corresponds to the third mip map level 505. Conversely, if filter mode data 436 represents an isotropic filter mode (i.e., filter mode data 436="0"), then the selected mip map level 422 corresponds to the previously selected first mip map level 503 or the second mip map level 504 represented as miplevel$_{max}$ or miplevel$_{min}$ 520.

It is contemplated that mip map level determination logic 420 and its associated logic components may be disposed on one or more physical cards for use in a computer system. For instance, the mip map level determination logic 420 and any individual components comprising it may be manufactured with or composed of one or more ICs, discrete logic devices, state machines, ASICs, or any other suitable programmable or non-programmable structure or structures. Alternatively, mip map level determination logic 420 and its associated logic components may be implemented in software as a plurality of executable instructions stored in suitable memory where the plurality of executable instructions may be executed by one or more suitable processors such as a CPU and a GPU (not shown). Executable instructions may be stored in any suitable memory device or devices such as by not limited to volatile and non-volatile memory, random access memory (including e.g., RAM, DRAM, SRAM), ROM-based memory (including e.g., ROM, PROM, EPROM, EEPROM) and flash memory. It is similarly contemplated that the processor may include at least one processing device such as, but not limited to, any suitable distributed or non-distributed processing or microprocessing device. Furthermore, as explained with reference to FIG. 2, mip map level determination logic 420 may comprise suitable logic to implement either the exact mathematical statements provided above or provide a suitable result by implementing an approximation thereof. It is further contemplated that if mip map level determination logic 420 is implemented in software where one or more processor executes instructions stored in memory, then mip map level determination logic may use the mathematical statements provided above or any suitable equivalent to select an appropriate mip-map level.

It is further contemplated that min-axis based mip map level determination logic 202 as illustrated in FIG. 2 may correspond to mip map level determination logic 420 where enable data 512 is set as min-axis enable data and where filter mode data 436 is set as isotropic filter mode data. Alternatively, min-axis based mip map level determination logic 202 may correspond to mip map level determination logic 420 without third mip map level calculation logic 507 and max/min/aniso selector logic 522 where a suitable adjustment is made to max/min control logic 510 that takes into account that filter mode data 436 is no longer supplied to the mip map level determination logic 420 (thus rendering unnecessary the AND gate logic 513).

Although not illustrated in FIGS. 4 and 5, it is contemplated that suitable control signals may be supplied to each of the individual pieces of logic and memory components. One of ordinary skill in the art will recognize that suitable control signals may be used to control the flow and synchronization of data and information communicated among the elements described above.

Figure 6:
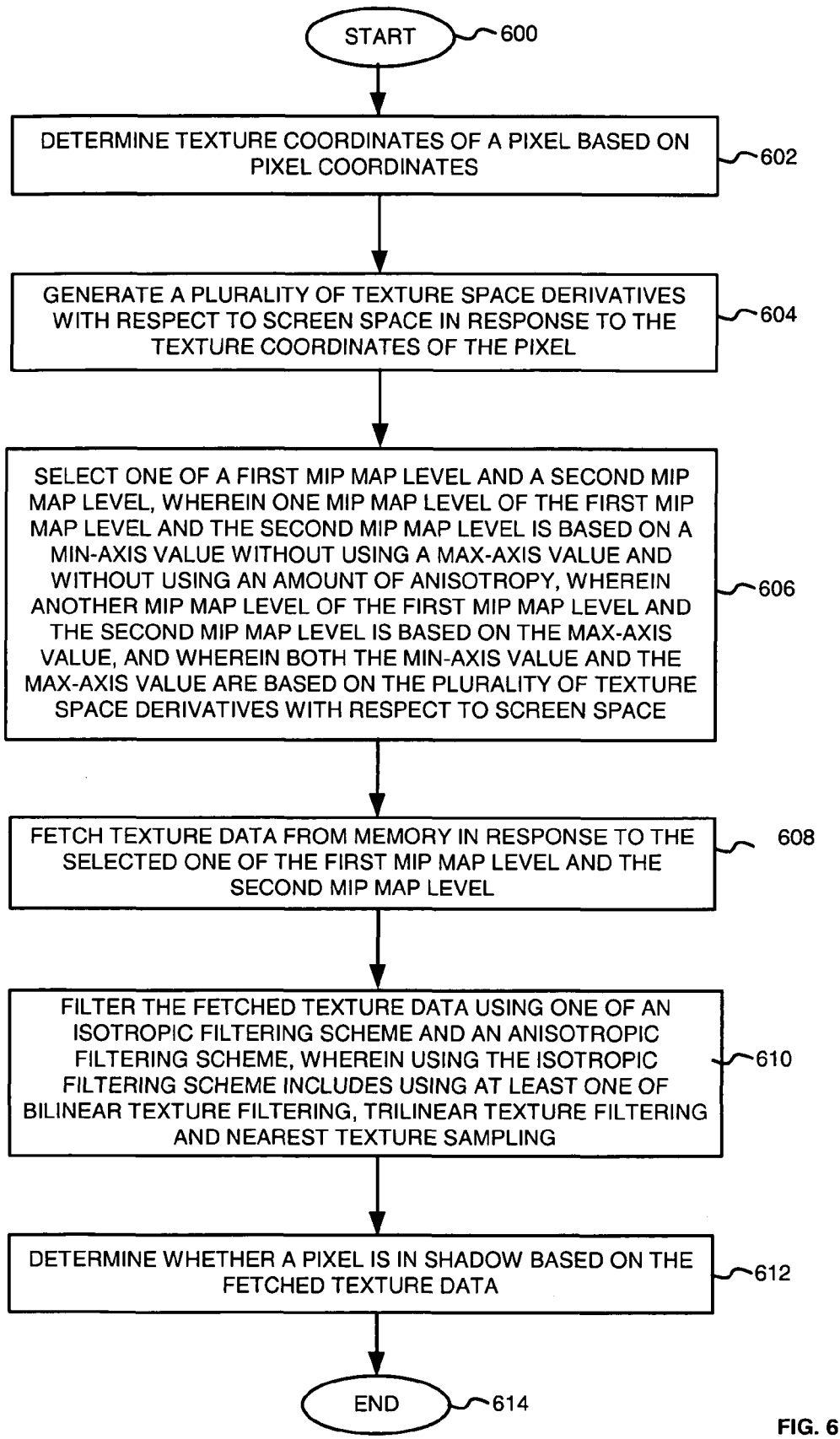
FIG. 6 is a flow chart illustrating one example of a method for selecting a mip map level from at least two mip map levels where one of the mip map levels is based on a min-axis value in accordance with one embodiment of the present disclosure.

FIG. 6 is a flowchart illustrating one example of a method for selecting a mip map level from at least two mip map levels where one of the mip map levels is based on a min-axis value in accordance with one embodiment to the present disclosure. The method begins in block 600 where, for example, pixel coordinates our received. In one embodiment, pixel coordinates such as pixel coordinates 404 of FIG. 4 may be received from any portion of the computer system (not shown) or any portion of a video graphic rendering engine. The method continues in block 602 where texture coordinates of a pixel are determined based on pixel coordinates. For purposes of illustration, this may correspond to utilizing logic 402 such as shader logic to receive pixel coordinates 404 and to determine texture coordinates 406 based on the pixel coordinates 404. In response to the texture coordinates, the method continues in block 604 where a plurality of texture space derivative with respect to screen space are generated. Referring to FIG. 4, gradient calculation logic 418 may be utilized to generate the plurality of texture space derivatives with respect to screen space 201 from texture coordinates 406. As provided above, the plurality of texture space derivatives with respect to screen space 201 may include du/dx, dv/dx, du/dy and dv/dy.

The method continues in block 606 where one of a first mip map level and a second mip map level is selected, wherein one mip map level of the first mip map level and the second mip map level is based on a min-axis value without using a max-axis value and without using an amount of anisotropy, wherein another mip map level of the first mip map level and the second mip map level is based on the max-axis value and wherein both the min-axis value and the max-axis value are based on the plurality of texture space derivatives with respect to screen space. In one embodiment, the selection of one of the first mip map level and a second mip map level is performed by a mip map level determination logic 420 as illustrated and explained above in reference to FIGS. 4 and 5. In another embodiment, the mip map level based on the min-axis value without using the max-axis value and without using the amount of anisotropy is selected during shadow mapping. Accordingly, the method continues in block 608 where texture data from memory is fetched in response to the selected one of the first mip map level and the second mip map level. Returning to FIG. 4 for purposes of illustration, texture addressing logic 204 receives the selected one of the first mip map level and the second mid level 422 and fetches from either cache 426 and/or memory 428, or some combination of both cache 426 and/or memory 428, the texture data corresponding to the selected one of the first mip map level and second mip map level. The fetched texture data 430 is then transmitted to filtering logic 432.

Figure 7:
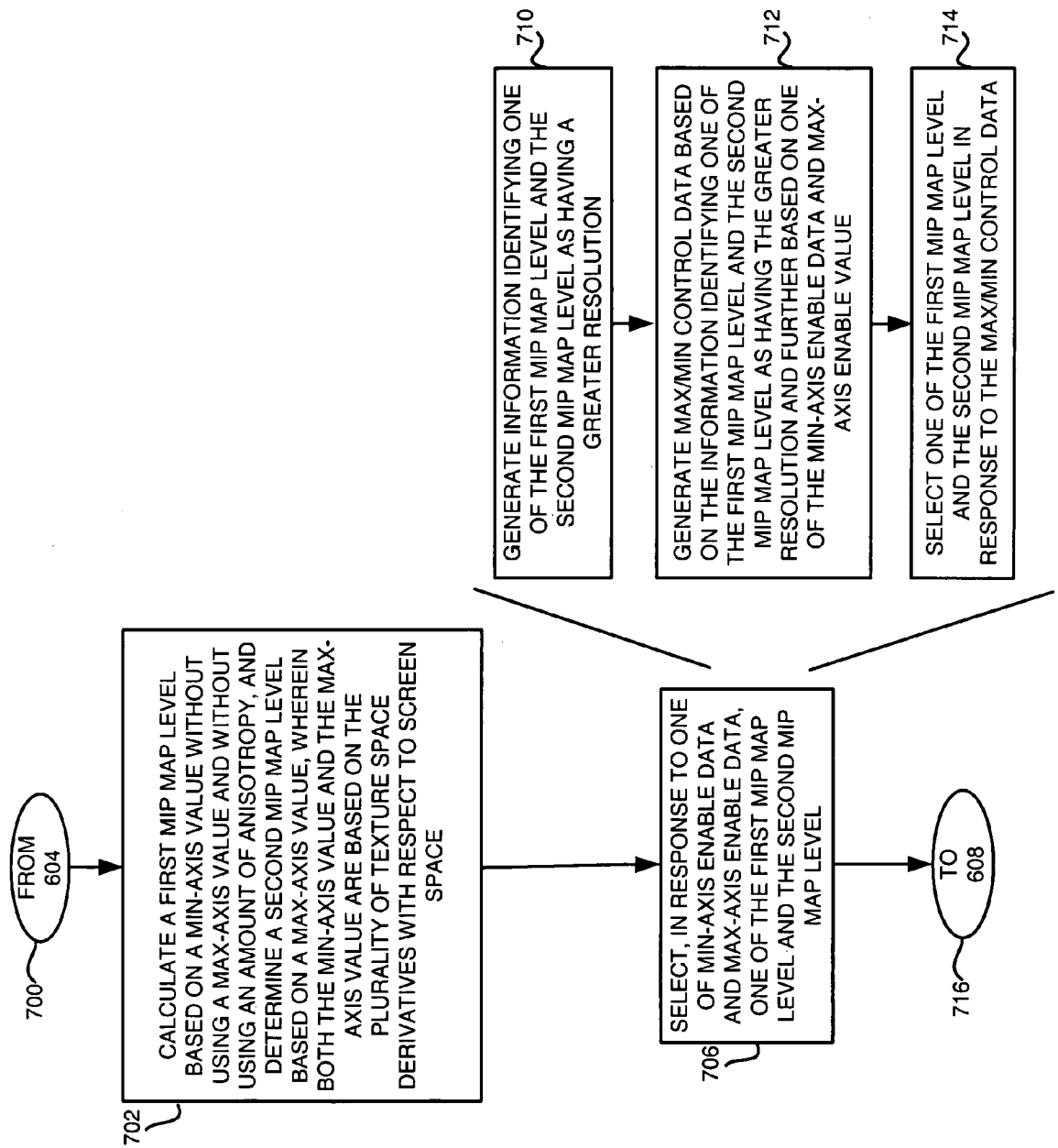
FIG. 7 is a flow chart illustrating a more detailed example of selecting a mip map level from at least two mip map levels where one of the mip map levels is based on a min-axis value in accordance with one embodiment of the present disclosure.

After fetching texture data, the method continues in block 610 where the fetched texture data is filtered using one of an isotropic filtering scheme and an anisotropic filtering scheme, wherein using the isotropic filtering scheme includes may include or incorporate, for example, bilinear texture filtering, trilinear texture filtering, nearest texture sampling, or bicubic texture filtering. According to one embodiment, filtering logic 432 receives the texture data 430 and generates therefrom filtered texture data 410 based on any suitable filtering scheme as described above. Next, the method includes determining whether a pixel is in a shadow based on the fetched texture data as illustrated in block 612. In one example, logic 402 such as shader logic receives the filtered texture data 410 and determines whether the pixel being rendered is in a shadow. Lastly, the method concludes with block 614 where, for instance, the pixel data is rendered into a suitable frame buffer such as frame buffer 414 as illustrated in FIG. 4 for subsequent display. FIG. 7 is a flow chart illustrating a more detailed example of selecting a mip map level from at least two mip map levels where one of the mip map levels is based on a min-axis value in accordance with one embodiment of the present disclosure. The method begins in block 700 where a plurality of texture space derivatives with respect to screen space have been generated in response to the texture coordinates of the pixel. This may correspond to block 604 as provided in FIG. 6. The method continues in block 702 where a first mip map level based on a min-axis value is calculated without using a max-axis value and without using an amount of anisotropy and where a second mip map level is calculated based on a max-axis value. In one embodiment, both the min-axis value and the max-axis value are based on the plurality of texture space derivates with respect to screen space. In one embodiment, the first mip map level and second mip map level are calculated using, for instance, mip map level determination logic 420 according to the description provided above.

The method continues in block 706 where one of the first mip map level and the second mip map level is selected in response to one of min-axis enable data and max-axis enable data. In one embodiment, the method of block 706 may be implemented by first generating information identifying of the first mip map level and the second mip map level as having a greater resolution as provided in block 710. Next as provided in block 712, max/min control data may be generated based on the information identifying one of the first mip map level and the second mip map level as having a greater resolution and further based on one of the min-axis enable data and max-axis enable data. Lastly, one of the first mip map level and the second mip map level may be selected in response to the max/min control data. As described above with reference to FIG. 5, the process of block 706 and blocks 710-714 may be implemented using max/min selector logic 502 and it associated components such as comparator logic 506, max/min control logic 510 and multiplexing logic 518. The method concludes in block 716 where, for example, texture data may be fetched from memory in response to the selected one of the first mip map level and the second mip map level as described with reference to block 608 of FIG. 6.

Figure 8:
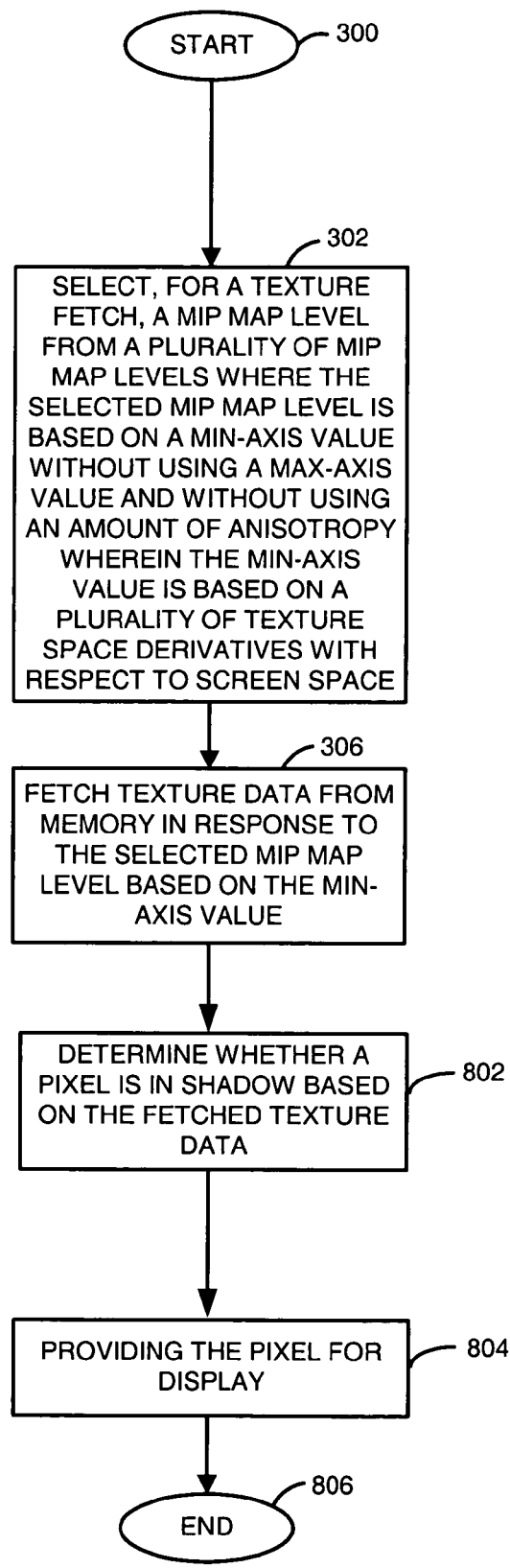
FIG. 8 is a flow chart illustrating one example of a method for providing a rendered pixel for display after selecting a mip map level based on a min-axis value when texture mapping in accordance with one embodiment of the present disclosure.

FIG. 8 is a flow chart illustrating one example of a method for providing a rendered pixel for display after selecting a mip map level based on a min-axis value when texture mapping in accordance with one embodiment of the present disclosure. The method begins with blocks 300, 302 and 306 as previously described with respect to FIG. 3. Next, the method continues in block 802 where it is determined whether a pixel is in shadow based on the fetched textured data. As described with respect to FIG. 4, logic 402 such as shader logic or any other suitable logic may be utilized to determine whether the pixel being rendered is in shadow based on the filtered texture data 410. The method continues in block 804 where the pixel is provided for display. Referring again to FIG. 4, this process may be implemented utilizing logic 402 to provide the rendered pixel for display on display 416 by way of frame buffer 414. The method concludes at block 806.

Figure 9:
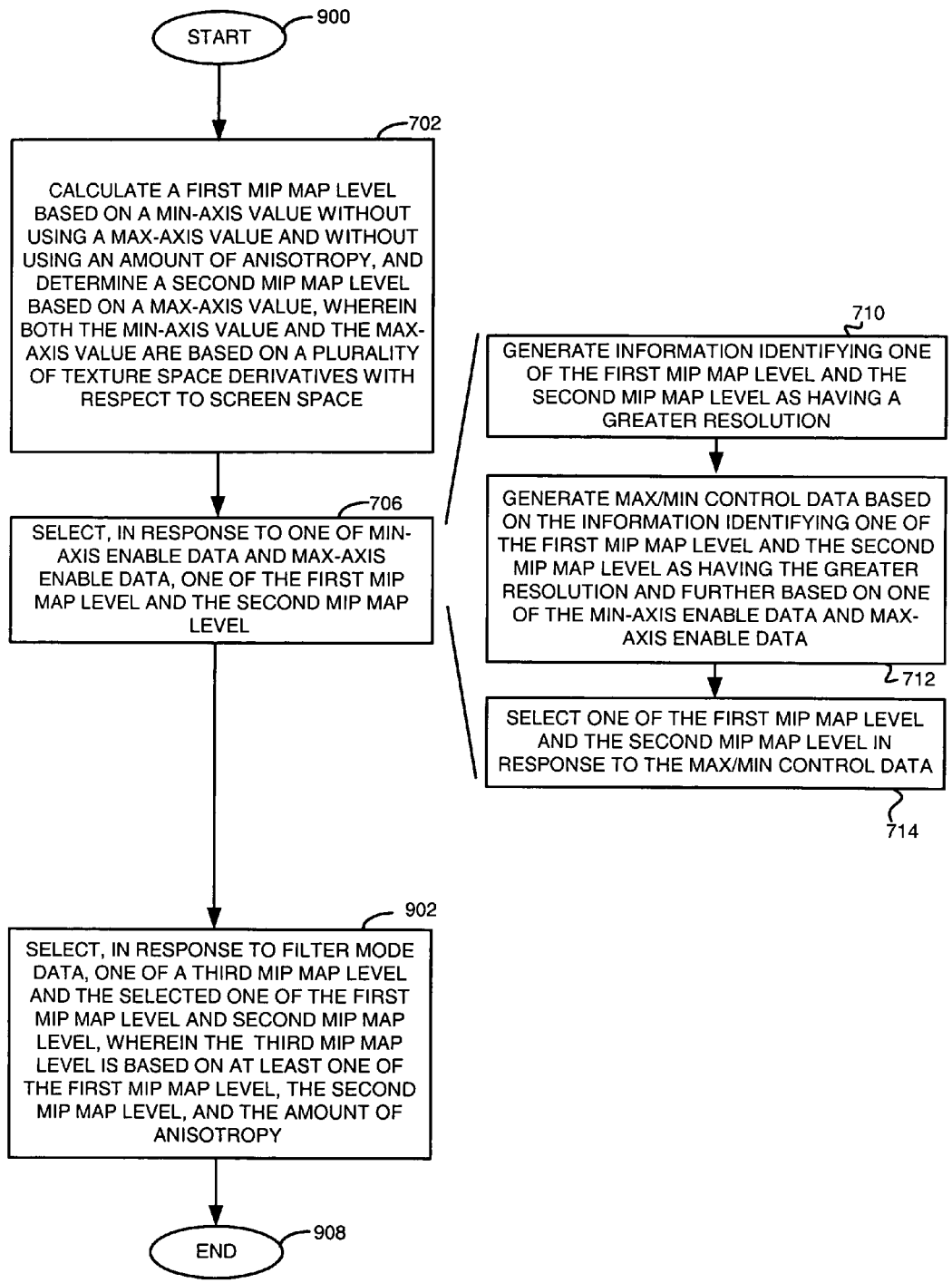
FIG. 9 is a flow chart illustrating one example of a method for selecting a mip map level from at least three mip map levels where one of the mip map levels is based on a min-axis value in accordance with one embodiment of the present disclosure.

FIG. 9 is a flow chart illustrating one example of a method for selecting a mip map level from at least three mip map levels where one of the mip map levels is based on a min-axis value in accordance with one embodiment of the present disclosure. The method begins at block 900 where, for example, a plurality of texture space derivatives with respect to screen space is received. The method continues in block 702, 706 and 710-714 as previously provided above with respect to FIG. 7. Next, the method continues in block 902, where, in response to filter mode data one of a third mip map level and the selected one of the first mip map level and second mip map level is selected where the third mip map level is determined based on at least one of the first mip map level, the second mip map level and an amount of anisotropy. In one embodiment, the selection associated with block 902 is implemented by mip map level determination logic 420 as described above. The method concludes in block 908 where, for example, texture data may be fetched from memory in response to the selected mip map level.

Figure 10:
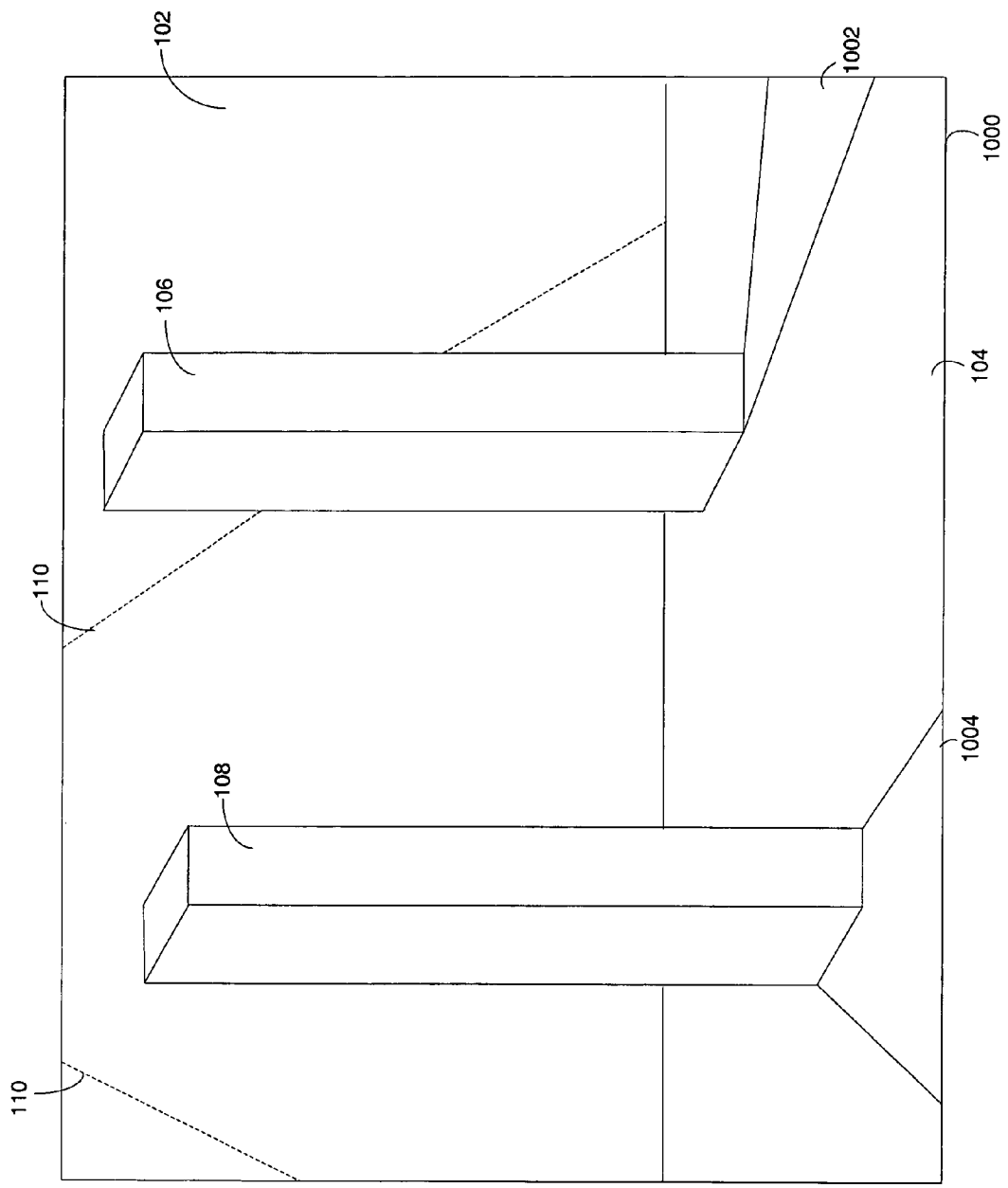
FIG. 10 illustrates video graphics primitives rendered on a display using a min-axis mip map level selection scheme.

FIG. 10 illustrates a rendered scene 1000 similar to scene 100 of FIG. 1 where video graphic primitives are rendered on a display using a min-axis mip map level selection scheme in accordance with one embodiment of the present disclosure. Accordingly, scene 1000 includes, among other things, a background 102, a floor 104, a first pillar 106, a second pillar 108, a light source 110, a first shadow 1002 of the first pillar 106 and a second shadow 1004 of the second pillar 108. Utilizing a min-axis mip map level selection scheme as described above with respect to FIGS. 2-9, the scene provided in FIG. 10 may be rendered without minimal artifacts due to aliasing. For instance, aliasing artifacts 116 and 118 present in scene 100 are noticeably absent in scene 1000 as a result of selecting one or more mip map levels based on a min-axis.

Among other benefits, the methods and apparatuses described above with reference to FIGS. 2-10 meet the needs previously presented by enabling a computer system, video graphics rendering engine or any other suitable device with a min-axis mip map level selection scheme where aliasing artifacts are reduced in a rendered image. Use of a min-axis mip map level prohibits a texel from mapping to more than one pixel, thereby improving the quality of the rendered image during texture mapping.

The above detailed description of the invention and the examples described therein have been presented for the purposes of illustration and description only and not by limitation. It is therefore contemplated the present invention cover any and all modifications, variations, or equivalents that fall in the spirit and scope of the basic underlying principles disclosed above and claimed herein. For instance, while the above embodiments have been described with respect to two-dimensional textures for clarity, it is contemplated that the methods and apparatuses described below may adequately be adapted to three-dimensional textures, as one of ordinary skill in the art would recognize. Additionally, it is contemplated that the various embodiments may implement any type of texture mapping, including but not limited to shadow texture maps and color texture maps.

What is claimed is:

1. An apparatus comprising:
   min-axis based mip map level determination logic operative to select, for a texture fetch, a mip map level from a plurality of mip map levels, wherein the selected mip map level is based solely on a min-axis value without using a max-axis value and without using any amount of anisotropy, and wherein the min-axis value is based on a plurality of texture space derivatives with respect to screen space; and
   texture addressing logic operative to fetch texture data including a plurality of texels from memory in response to the selected mip map level based on the min-axis value;
   wherein each one of the plurality of texels maps to no more than one pixel.

2. An apparatus comprising:
   one or more processors coupled to memory storing executable instructions, wherein execution of the executable instructions by the one or more processors causes the one or more processors to:
   select, for a texture fetch, a mip map level from a plurality of mip map levels, wherein the selected mip map level is based solely on a min-axis value without using a max-axis value and without using any amount of anisotropy, and wherein the min-axis value is based on a plurality of texture space derivatives with respect to screen space and select the mip map level from the plurality of mip map levels during shadow mapping; and
   fetch texture data including a plurality of texels from memory in response to the selected mip map level based on the min-axis value;
   wherein each one of the plurality of texels maps to no more than one pixel.

3. An apparatus comprising:
   mip map level determination logic comprising selection logic operative to select a mip map level using differing mip map level selection criteria one of a first mip map level and a second mip map level, wherein one mip map level of the first mip map level and the second mip map level is based solely on a min-axis value without using a max-axis value and without using any amount of anisotropy, wherein another mip map level of the first mip map level and the second mip map level is based on the max-axis value that is also based the plurality of texture space derivatives with respect to screen space, and wherein both the min-axis value and the max-axis value are based on a plurality of texture space derivatives with respect to screen space; and
   texture addressing logic operative to fetch texture data including a plurality of texels from memory in response to the selected one of the first mip map level and the second mip map level;
   wherein each one of the plurality of texels maps to no more than one pixel.

4. The apparatus of claim 3 wherein the selection logic is also operative to select, in response to anisotropic filter mode data, a third mip map level that is determined based on at least one of the first mip map level, the second mip map level and the amount of anisotropy.

5. The apparatus of claim 3, further comprising:
   logic operative to determine texture coordinates of a pixel based on pixel coordinates; and
   gradient calculation logic operative to generate the plurality of texture space derivatives with respect to screen space based on the texture coordinates of the pixel.

6. The apparatus of claim 3, further comprising filtering logic operative to filter the fetched texture data using one of an isotropic filtering scheme and an anisotropic filtering scheme, wherein using the isotropic filtering scheme includes using at least one of bilinear texture filtering, trilinear texture filtering, nearest texture sampling and bicubic texture filtering.

7. The apparatus of claim 3, wherein:
   the mip map level determination logic further comprises length calculation logic operative to calculate the first mip map level and the second mip map level based on the plurality of texture space derivatives with respect to screen space; and
   the selection logic comprises max/min selector logic operative to select, in response to one of min-axis enable data and max-axis enable data, one of the first mip map level and the second mip map level.

8. The apparatus of claim 7, wherein the max/min selector logic comprises:
   comparator logic operative to generate information identifying one of the first mip map level and the second mip map level as having a greater resolution;
   max/min control logic operative to generate max/min control data based on the information identifying one of the first mip map level and the second mip map level as having the greater resolution and further based on one of min-axis enable data and max-axis enable data; and
   multiplexing logic operative to select one of the first mip map level and the second mip map level in response to the max/min control data.

9. The apparatus of claim 3, further comprising logic operative to determine whether a pixel is in shadow based on the fetched texture data.

10. A method comprising:
    selecting one of a first mip map level and a second mip map level, wherein one mip map level of the first mip map level and the second mip map level is based solely on a min-axis value without using a max-axis value and without using any amount of anisotropy, wherein another mip map level of the first mip map level and the second mip map level is based on the max-axis value, and wherein both the min-axis value and the max-axis value are based on the plurality of texture space derivatives with respect to screen space;

fetching texture data including a plurality of texels from memory in response to the selected one of the first mip map level and the second mip map level;

wherein each one of the plurality of texels maps to no more than one pixel.

11. The method of claim 10 further comprising selecting, in response to anisotropic filter mode data, a third mip map level that is determined based on at least one of the first mip map level or the second mip map level and the amount of anisotropy.

12. The method of claim 10 further comprising:
determining texture coordinates of a pixel based on pixel coordinates; and
generating a plurality of texture space derivatives with respect to screen space based on the texture coordinates of the pixel.

13. The method of claim 10 further comprising filtering the fetched texture data using one of an isotropic filtering scheme and an anisotropic filtering scheme, wherein using the isotropic filtering scheme includes using at least one of bilinear texture filtering, trilinear texture filtering, nearest texture sampling and bicubic texture filtering.

14. The method of claim 10 further comprising:
calculating the first mip map level and the second mip map level in response to the plurality of texture space derivatives with respect to screen space; and
selecting, in response to one of min-axis enable data and max-axis enable data, one of the first mip map level and the second mip map level.

15. The method of claim 14, wherein selecting, in response to one of min-axis enable data and max-axis enable data, one of the first mip map level and the second mip map level comprises:
generating information identifying one of the first mip map level and the second mip map level as having a greater resolution;
generating max/min control data based on the information identifying one of the first mip map level and the second mip map level as having the greater resolution and further based on one of the min-axis enable data and max-axis enable data; and
selecting one of the first mip map level and the second mip map level in response to the max/min control data.

16. The method of claim 10 further comprising determining whether a pixel is in shadow based on the fetched texture data.

17. A device comprising:
a display;
mip map level determination logic operative to select, for a texture fetch, a mip map level from a plurality of mip map levels based solely on a min-axis value that is based on a plurality of texture space derivatives with respect to screen space without using a max-axis value and without using any amount of anisotropy;
texture addressing logic operative to fetch texture data including a plurality of texels from memory in response to the selected mip map level that is based on the min-axis value; and
logic operative to determine whether a pixel is in shadow based on the fetched texture data and to provide the pixel for display at the display;
wherein each one of the plurality of texels maps to no more than one pixel.

18. A method comprising:
selecting, for a texture fetch, a mip map level from a plurality of mip map levels based solely on a min-axis value that is based on a plurality of texture space derivatives with respect to screen space without using a max-axis value and without using any amount of anisotropy;
fetching texture data including a plurality of texels from memory in response to the selected mip map level based on the min-axis value;
determining whether a pixel is in shadow based on the fetched texture data; and
providing the pixel for display;
wherein each one of the plurality of texels maps to no more than one pixel.

19. An apparatus comprising:
mip map level determination logic comprising:
length calculation logic operative to calculate a first mip map level based solely on a min-axis value without using a max axis value and without using any amount of anisotropy such that a corresponding texel in a texture map maps to no more than one pixel, and further operative to determine a second mip map level based on the max-axis value, wherein both the min-axis value and the max-axis value are based on a plurality of texture space derivatives with respect to screen space;
max/min selector logic operative to select, in response to one of min-axis enable data and max-axis enable data, one of the first mip map level and the second mip map level, wherein the max/min control logic comprises:
comparator logic operative to generate information identifying one of the first mip map level and the second mip map level as having a greater resolution;
max/min control logic operative to generate max/min control data based on information identifying one of the first mip map level and the second mip map level as having the greater resolution, and further based on one of min-axis enable data and max-axis enable data; and
multiplexing logic operative to select one of the first mip map level and the second mip map level in response to the max/min control data; and
max/min/anisotropic selector logic operative to select, in response to filter mode data, one of a third mip map level, and the selected one of the first mip map level and the second mip map level, wherein the third mip map level is based on at least one of the first mip map level, the second mip map level, and the amount of anisotropy.

20. The apparatus of claim 19, wherein the max/min/anisotropic selector logic comprises multiplexing logic operative to select, in response to the filter mode data, one of: the third mip map level, and the selected one of the first mip map level and the second mip map level.

21. A method, by a video graphics engine, comprising:
calculating, by the video graphics engine, a first mip map level based solely on a min-axis value without using a max-axis value and without using any amount of anisotropy such that a corresponding texel in a texture map maps to no more than one pixel, and determining a second mip map level based on the max-axis value, wherein both the min-axis value and the max-axis value are based on a plurality of texture space derivatives with respect to screen space;
selecting, by the video graphics engine, in response to one of min-axis enable data and max-axis enable data, one of the first mip map level and the second mip map level by:
generating information identifying one of the first mip map level and the second mip map level as having a greater resolution;

generating max/min control data based on the information identifying one of the first mip map level and the second mip map level as having a greater resolution, and further based on one of the min-axis enable data and max-axis enable data; and
selecting one of the first mip map level and the second mip map level in response to the max/min control data; and selecting, by the video graphics engine, in response to filter mode data, one of a third mip map level and the selected one of the first mip map level and second mip map level, wherein the third mip map level is based on at least one of the first mip map level, the second mip map level, and the amount of anisotropy.

* * * * *